(12) United States Patent
Ngal et al.

(10) Patent No.: US 10,379,222 B2
(45) Date of Patent: Aug. 13, 2019

(54) SYSTEMS, DEVICES, AND/OR METHODS FOR RESONANT LIGHT RANGING AND DISTANCE SENSING

(71) Applicant: Z-SENZ LLC, Gaithersburg, MD (US)

(72) Inventors: Darryl Ngal, Bathesda, MD (US); Christopher Brown, Gaithersburg, MD (US)

( * ) Notice: Subject to any disclaimer, the term of this patent is extended or adjusted under 35 U.S.C. 154(b) by 0 days.

(21) Appl. No.: 15/993,556

(22) Filed: May 30, 2018

(65) Prior Publication Data
US 2018/0275276 A1    Sep. 27, 2018

Related U.S. Application Data

(63) Continuation-in-part of application No. 14/792,184, filed on Jul. 6, 2015, now Pat. No. 10,054,286, and a continuation-in-part of application No. 62/021,089, filed on Jul. 4, 2014.

(60) Provisional application No. 62/512,681, filed on May 30, 2017.

(51) Int. Cl.
| | |
|---|---|
| *G01S 17/32* | (2006.01) |
| *G02B 27/09* | (2006.01) |
| *G02B 5/20* | (2006.01) |
| *G01S 7/481* | (2006.01) |
| *G01S 17/10* | (2006.01) |
| *G01S 17/42* | (2006.01) |
| *G02B 26/10* | (2006.01) |

(52) U.S. Cl.
CPC ............ *G01S 17/32* (2013.01); *G01S 7/4817* (2013.01); *G01S 7/4818* (2013.01); *G01S 17/10* (2013.01); *G01S 17/42* (2013.01); *G02B 5/20* (2013.01); *G02B 26/103* (2013.01); *G02B 27/0955* (2013.01); *G02B 27/0994* (2013.01)

(58) Field of Classification Search
CPC ............................... G01S 17/32; G01S 7/4817
See application file for complete search history.

(56) References Cited

U.S. PATENT DOCUMENTS

| | | | | |
|---|---|---|---|---|
| 9,639,934 | B2* | 5/2017 | Johnston | A61B 1/00057 |
| 9,835,851 | B2* | 12/2017 | Funakubo | G02B 26/101 |
| 9,869,754 | B1* | 1/2018 | Campbell | G01S 7/4817 |
| 2001/0055462 | A1* | 12/2001 | Seibel | A61B 1/00048 |
| | | | | 385/147 |
| 2002/0064341 | A1* | 5/2002 | Fauver | G02B 6/241 |
| | | | | 385/25 |

(Continued)

FOREIGN PATENT DOCUMENTS

WO    WO-2018036795 A1 *  3/2018  ........... G01S 7/4817

*Primary Examiner* — Sung H Pak
(74) *Attorney, Agent, or Firm* — Dale Jensen, PLC; Dale Jensen (57) ABSTRACT

Certain exemplary embodiments can provide a resonant scanning LIDAR system, which comprises a modulated continuous-wave or pulsed light source, an optomechanical element that generates a light scan having a bounded periodic motion or a substantially periodic motion, a scan lens element that focuses light onto a distant target, a detector element that detects scattered or reflected light from the distant target, and a controller that controls light source modulation, bounded periodic motion of the optomechanical element, and acquires a signal from the detector element.

8 Claims, 6 Drawing Sheets
(3 of 6 Drawing Sheet(s) Filed in Color)

(56) References Cited

U.S. PATENT DOCUMENTS

| | | | |
|---|---|---|---|
| 2006/0186325 A1* | 8/2006 | Johnston | G02B 6/262 |
| | | | 250/234 |
| 2006/0195014 A1* | 8/2006 | Seibel | A61B 1/0008 |
| | | | 600/102 |
| 2008/0058629 A1* | 3/2008 | Seibel | A61B 1/0008 |
| | | | 600/368 |
| 2010/0033792 A1* | 2/2010 | Shih | G02B 9/10 |
| | | | 359/206.1 |
| 2016/0245919 A1* | 8/2016 | Kalscheur | G01S 17/89 |
| 2018/0275249 A1* | 9/2018 | Campbell | G01S 7/4817 |
| 2018/0284282 A1* | 10/2018 | Hong | G01S 17/10 |

* cited by examiner

SYSTEMS, DEVICES, AND/OR METHODS FOR RESONANT LIGHT RANGING AND DISTANCE SENSING

CROSS-REFERENCES TO RELATED APPLICATIONS

This application claims priority to, and incorporates by reference herein in its entirety, pending U.S. Provisional Patent Application Ser. No. 62/512,681, filed May 30, 2017. This application is related to, and incorporates by reference herein in its entirety, pending U.S. patent application Ser. No. 14/792,184, filed Jul. 6, 2015, which application claimed priority to Provisional application No. 62/021,089, filed Jul. 4, 2014.

BRIEF DESCRIPTION OF THE DRAWINGS

The patent or application file contains at least one drawing executed in color. Copies of this patent or patent application publication with color drawings will be provided by the Office upon request and payment of the necessary fee. A wide variety of potential practical and useful embodiments will be more readily understood through the following detailed description of certain exemplary embodiments, with reference to the accompanying exemplary drawings in which.

DETAILED DESCRIPTION

Certain exemplary embodiments can provide a resonant scanning LIDAR system, which comprises a modulated continuous-wave or pulsed light source, an optomechanical element that generates a light scan having a bounded periodic motion or a substantially periodic motion, a scan lens element that focuses light onto a distant target, a detector element that detects scattered or reflected light from the distant target, and a controller that controls light source modulation, bounded periodic motion of the optomechanical element, and acquires a signal from the detector element.

Beam scanning optical systems can be used in light detection and ranging ("LIDAR") time-of-flight distance sensing technologies. Time-of-flight distance sensors measure distance by measuring the time required for a pulse of light to travel from the instrument scatter or reflect from a distant object and return to the instrument. Beam scanning LIDAR light source and detector circuitry can be mounted on a bracket that can be scanned linearly with a motor in one or two dimensions to acquire distance data one point at a time across a field-of-view (FOV). Certain exemplary systems can have a relatively large size, weight, and power (SWAP) consumption characteristics due to use of one or more motorized actuators. Certain exemplary systems can have a relatively high cost due to large number of components required by multiplexed LIDAR light sources and detectors. Certain exemplary systems can have limitations in system performance such as small-size scanned FOV, FOVs with high degrees of asymmetry, and/or limited frame rate of acquisition due use of linear actuators, etc.

Certain exemplary embodiments enable resonant light detection and ranging (R-LIDAR) distance sensing based upon use of relatively small-size and large-displacement resonant optomechanical beam scans and resonant scan lens technologies, allow for construction of sensors with reduced system SWAP and/or expense compared to other systems.

Figure 1:
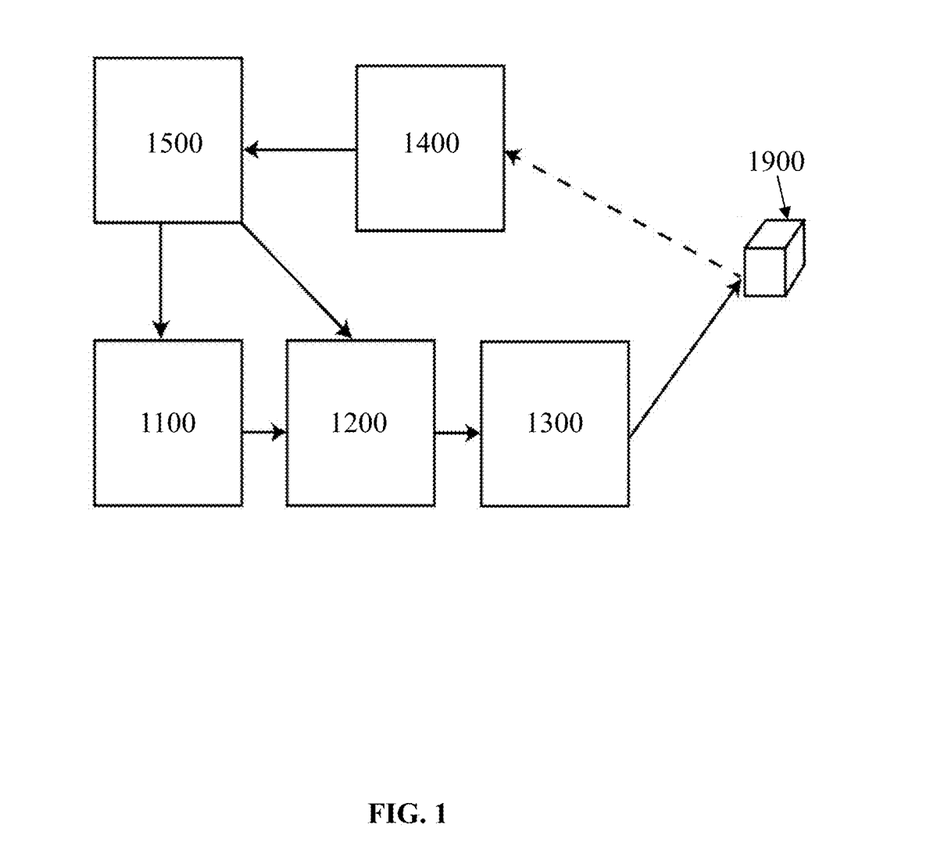
FIG. 1 shows R-LIDAR system diagram including light source, bounded periodic motion (BPM) scanner, scan lens, light signal projected towards and reflecting and/or scattering from a distance object, detector, and system controller.

Certain exemplary R-LIDAR distance sensor system comprise: (1) a modulated continuous-wave (CW) or pulsed light source, (2) an optomechanical element to produce a light scan having a bounded periodic motion (BPM) or a substantially periodic motion, (3) a scan lens element that focus light onto a distant target, (4) a detector element that detects scattered or reflected light from a distant object, and/or (5) a controller that controls light source modulation, BPM of the optomechanical element, and acquires signal from the detector, as shown in FIG. 1. The frequency of the motion from the BPM optomechanical element occurs at the resonant frequency of the optomechanical structure. The frequency and amplitude of the resonant motion is higher than that of a linear system and thereby enables high-speed and high-displacement operation of the sensor within a small-SWAP and low-cost instrumentation. Furthermore, the optomechanical characteristics of the system can be designed to minimize the sensitivity of the instrument to environmental noise and vibration. And elements of the system can be fabricated using relatively low-cost microfabrication techniques.

In an exemplary embodiment, an R-LIDAR resonant scanner was created to generate a Lissajous scan, using a piezo tube actuator, piezo amplifier, and driver electronics. A Lissajous-type resonant scanner was designed for the R-LIDAR system to create a two-dimensional resonant beam scan. Advantages of a dual-resonant Lissajous beam scan comprise: (1) high scan speeds, rates of data acquisition, and image frame rates, (2) large mechanical displacements from a compact size and low SWAP apparatus, and/or (3) a scanned field-of-view (FOV) similar in aspect ratio to conventional focal plane array (e.g., rectangular or square) image sensors.

Certain exemplary embodiments provide a resonant scanning LIDAR system, which can comprise:
  a modulated continuous-wave or pulsed light source 1100;
  an optomechanical element 1200 that generates a light scan having a bounded periodic motion or a substantially periodic motion, wherein;
    frequency of motion from optomechanical element 1200 occurs at a resonant frequency of the system;
    the light scan is a Lissajous scan; and
    the light scan has a frequency that is between 500-3000 Hz;
  a scan lens element 1300 that focuses light onto a distant target 1900;

a detector element 1400 that detects scattered or reflected light from the distant target, wherein the detector element utilizes separate optics from the optomechanical element; and a controller 1500 that controls light source modulation, bounded periodic motion of the optomechanical element, and acquires a signal from the detector element.

Resonant frequencies of the system can be approximately 2033 Hz and approximately 1728 Hz. The system is capable of distinguishing features less than approximately 0.6 degrees.

In certain exemplary embodiments, detector element 1400 does not detect light via an optical fiber.

A resonant BPM Lissajous scan was generated from a fixed-free, axially symmetric, cantilever beam optical fiber. By removing material along the length of the optical fiber, the axial symmetry of the optical fiber's cross section is broken and two resonant axes were created. Modification of the optical fiber geometry allowed for creation of an optomechanical system with two distinct and substantially orthogonal resonant frequencies. The system design used approximately 18.5 µm of glass cladding to be removed from an approximately 125 µm diameter single mode optical fiber (HP-780, Nufern) to create the resonant optomechanical system, as described in FIG. 2 (*a*). The geometry of the optical fiber and its material properties are described in Table 1. Modal analysis of the fixed-free optical fiber dynamics was conducted using COMSOL (COMSOL Multiphysics 5.2a, COMSOL Inc.) finite element analysis (FEA). Analysis indicated that the first two resonant frequencies of the cantilevered fiber are orthogonal to each other and differ by 1.15× for the geometry described in Table 1. The results of the FEA simulation showing the first two resonant frequencies of the optomechanical scanner are displayed in FIG. 2 (*c*) and FIG. 2 (*d*). This resonant optomechanical system yields a scan displacement and velocity across the FOV described in FIG. 2 (*b*). The anticipated R-LIDAR image properties resulting from the optomechanical design are listed in Table 2.

Figure 3:
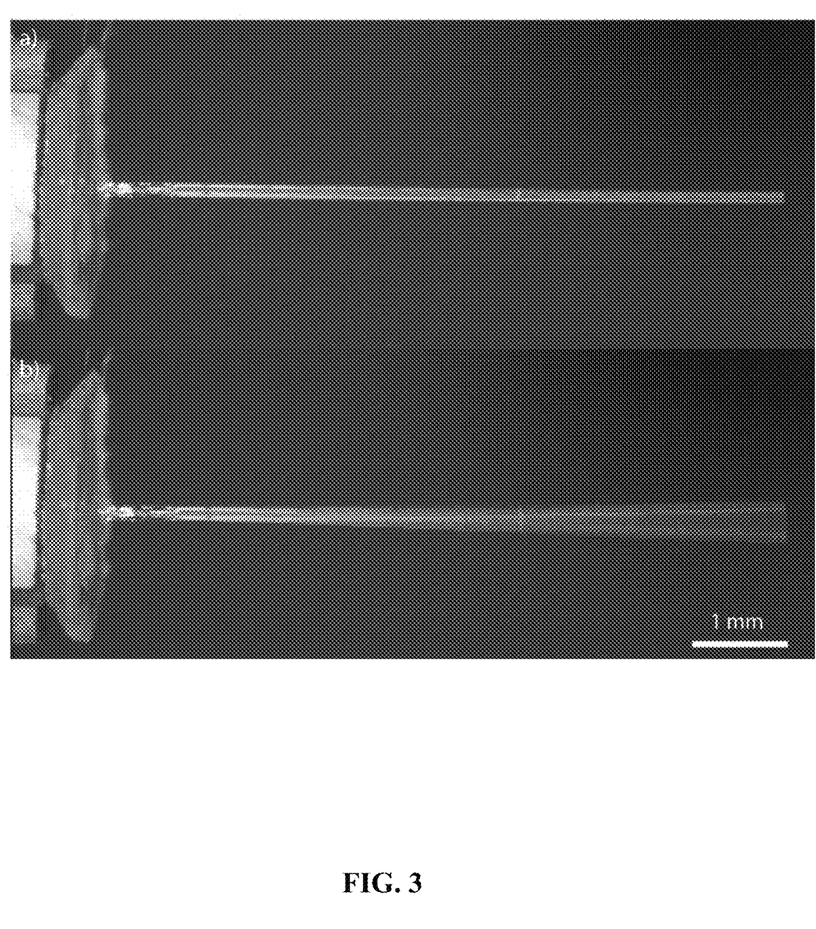
FIG. 3 shows BPM optomechanical scanners: (a) Static optomechanical scanner and (b) resonant BPM optomechanical system.

An optomechanical element was fabricated by abrasive removal of material from a cylindrical optical fiber. The fabricated optical fiber was adhered to a piezo ceramic tube actuator and driven at its resonant frequency. The resonant frequencies of the BPM optomechanical system were identified by sweeping the actuation frequency of the fabricated optomechanical system from 500-3000 Hz while visually inspecting the resonant scan element using microscope, as shown in FIG. 3. The resonant frequencies of the experimental system were determined to be approximately 2033 Hz and approximately 1728 Hz using this method.

Figure 4:
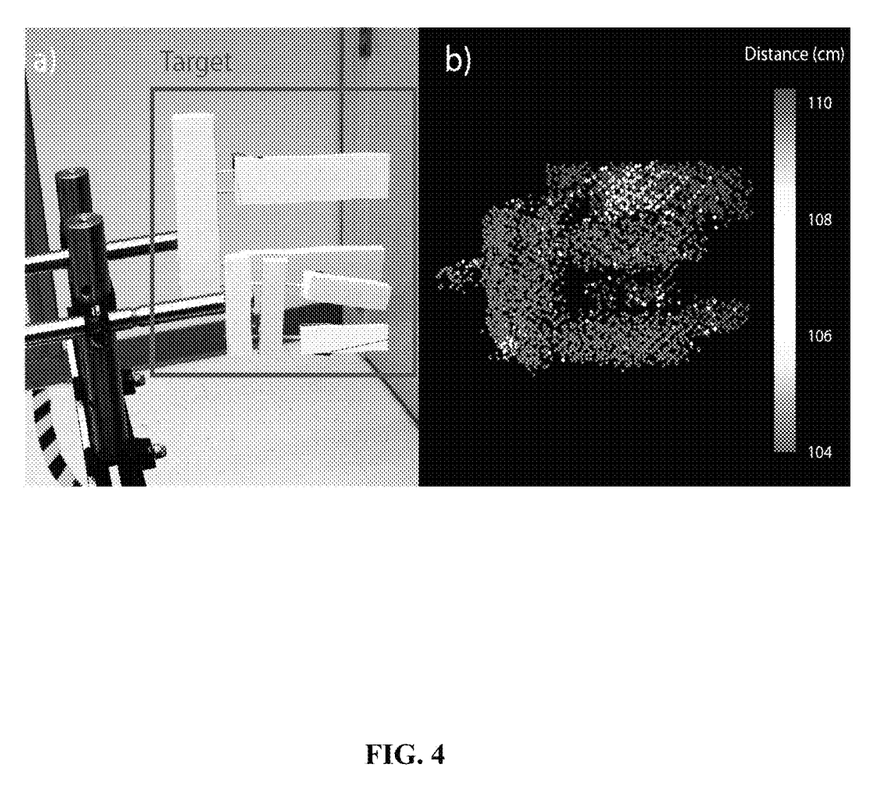
FIG. 4 shows test target images: (a) Optical image of resolution target and (b) R-LIDAR-generated 3D point cloud of an approximately 1.5 cm diameter bar/space target.

The resonant BPM scan element was integrated with the scan lens, light source, detector, and controller elements described in FIG. 1. The R-LIDAR system was measured to have a substantially full width half maximum (FWHM) beam width of approximately 8 mm at a distance approximately 2 m from the sensor. The scanned FOV was measured to be greater than approximately 1 m×1 m, indicating a lateral resolution of approximately 125×125 pixels. The R-LIDAR instrument was used to create a 3D image of the test target was imaged as shown in FIG. 4 (*a*). The target was placed approximately 104 cm from the detector at its closest point and the smallest spacing between the bar and space targets was measured to be approximately <1 cm. Data was acquired at a frame rate of approximately 20 Hz and a single frame of acquired data is shown in FIG. 4 (*b*). The results show that the system is capable of distinguishing features less than approximately 0.6 degrees.

TABLE 1

Optical Fiber Geometer and Material Properties

| Geometry and Properties | Value |
|---|---|
| Fiber Cross Sectional Diameter | 125 µm, with 18.5 µm deep notch |
| Fiber Length | 7.2 mm |
| Fiber (silica) density (p/row) | 2202 kg/m$^3$ |
| Modulus of elasticity (E) | 73 GPa |

TABLE 2

R-LIDAR Image Properties

| Geometry and Properties | Value |
|---|---|
| X-axis Pixels | 64 |
| Y-axis Pixels | 64 |
| Full Frame Data Points | 7680 |
| Frame Rate | 28.7 Hz |
| Data Points Acquired/s | 220k |

TABLE 3

R-LIDAR Performance Specifications

| Parameter | Specification |
|---|---|
| Resolution | 125 × 125 pixels/frame |
| Frame Rate | 20 Hz |

FIG. 1 shows R-LIDAR system diagram including light source, BPM scanner, scan lens, light signal projected towards and reflecting and/or scattering from a distance object, detector, and system controller.

Figure 2:
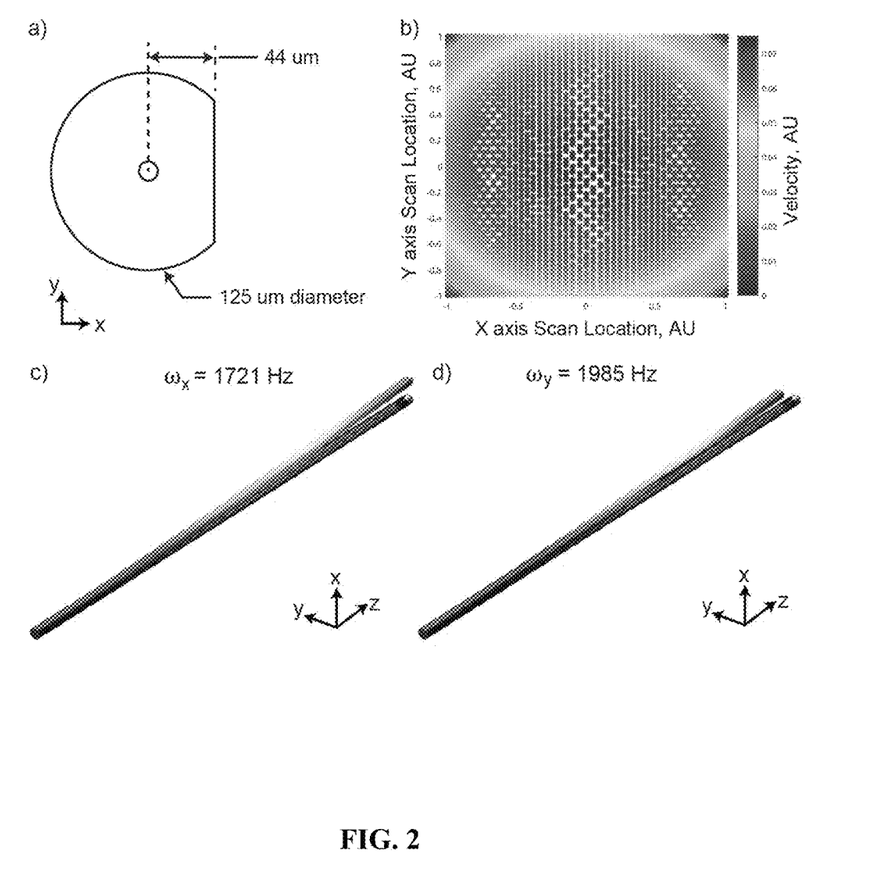
FIG. 2 shows BPM resonant scanner design plots. (a) Cross-sectional diagram of fixed-free cantilever optical fiber. (b) Scan displacement and velocity across the Lissajous BPM scanned FOV assuming 64×64 pixel sampling. (c) First mode resonant frequency ($\omega x=1721$ Hz). (d) Second mode resonant frequency ($\omega y=1985$ Hz)

FIG. 2 shows BPM resonant scanner design plots. (a) Cross-sectional diagram of fixed-free cantilever optical fiber. (b) Scan displacement and velocity across the Lissajous BPM scanned FOV assuming 64×64 pixel sampling. (c) First mode resonant frequency ($\omega x$=1721 Hz). (d) Second mode resonant frequency ($\omega y$=1985 Hz).

FIG. 3 shows BPM optomechanical scanners: (a) Static optomechanical scanner and (b) resonant BPM optomechanical system.

FIG. 4 shows test target images: (a) Optical image of resolution target and (b) R-LIDAR-generated 3D point cloud of an approximately 1.5 cm diameter bar/space target, with the specifications described in Table 3.

Figure 5:
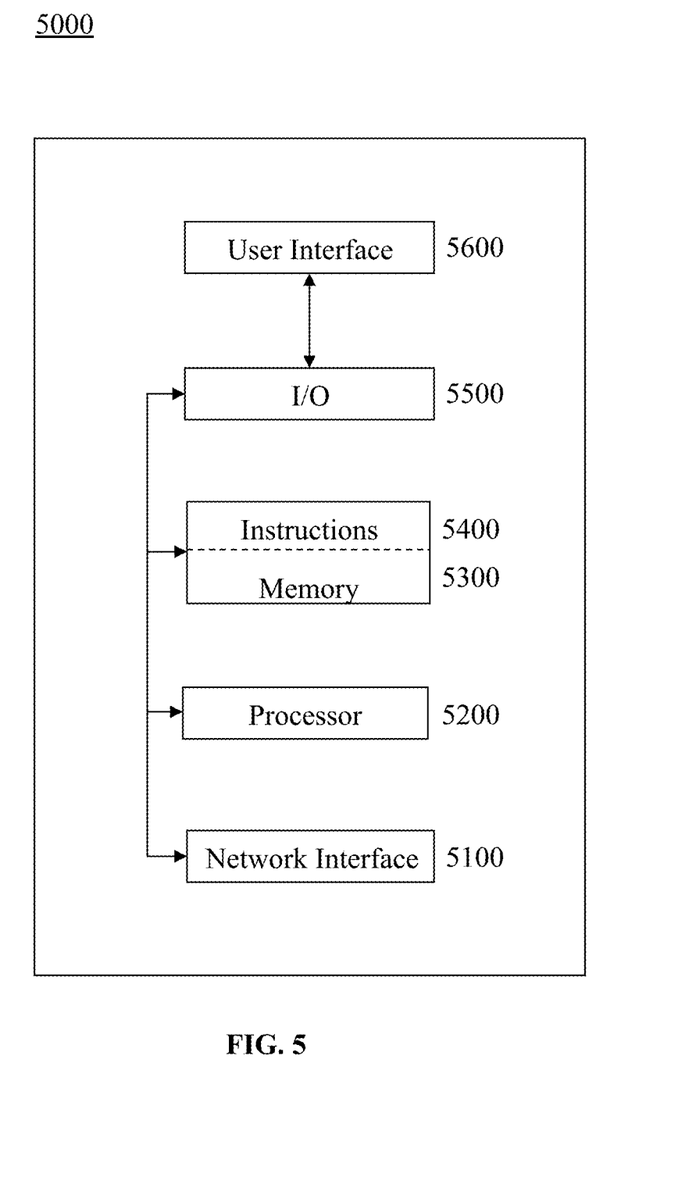
FIG. 5 is a block diagram of an exemplary embodiment of an information device 5000.

FIG. 5 is a block diagram of an exemplary embodiment of an information device 5000, which in certain operative embodiments can comprise, for example, the Control Electronics of FIG. 1. Information device 5000 can comprise any of numerous circuits and/or components, such as for example, one or more network interfaces 5100, one or more processors 5200, one or more memories 5300 containing instructions 5400, one or more input/output ("I/O") devices 5500, and/or one or more user interfaces 5600 coupled to one or more I/O devices 5500, etc.

In certain exemplary embodiments, via one or more user interfaces 5600, such as a graphical user interface, a user can view a rendering of information related to LIDAR systems.

Figure 6:
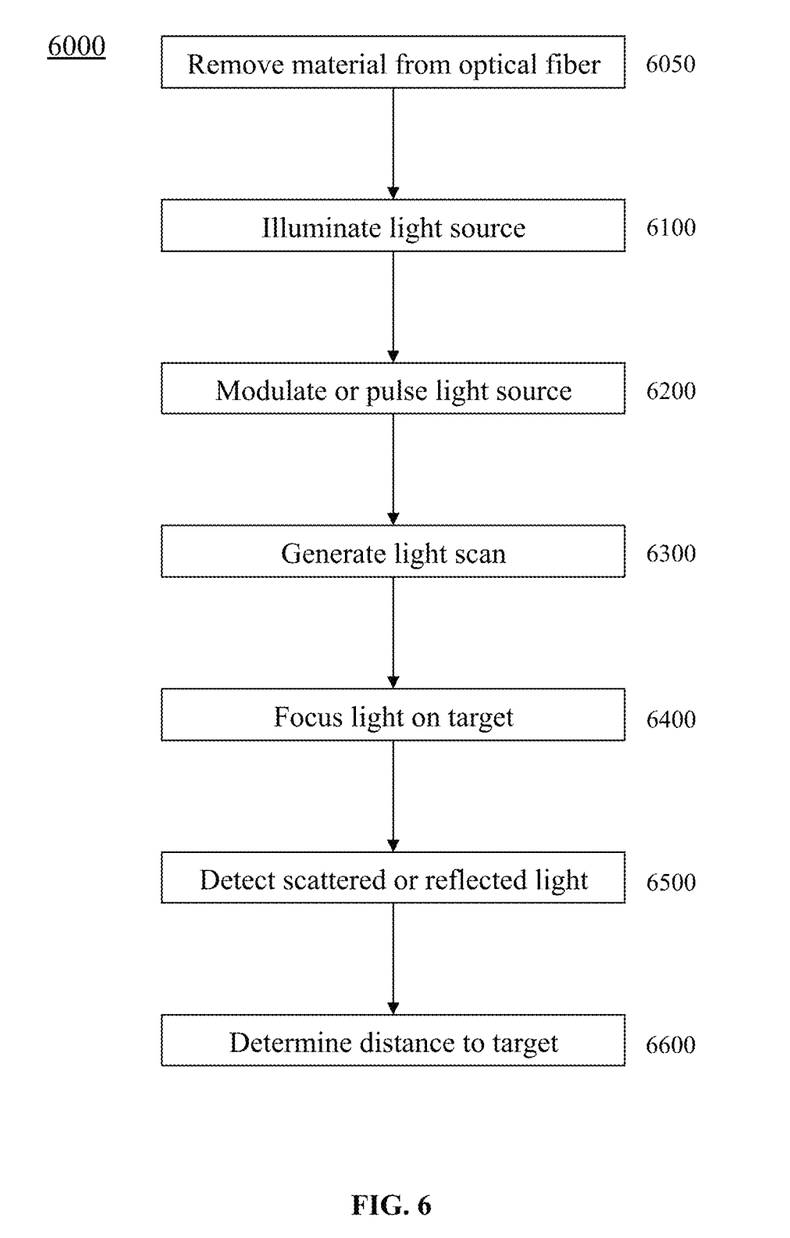
FIG. 6 is a flowchart of an exemplary embodiment of a method 6000.

FIG. 6 is a flowchart of an exemplary embodiment of a method 6000. At activity 6050 material can be removed from an optical fiber. In certain exemplary embodiments, material is removed along a length of an optical fiber, wherein an axial symmetry of a cross section of the optical fiber is broken and two resonant axes are created.

At activity 6100 a light source is illuminated. At activity 6200, the light source is modulated or pulsed. At activity 6300, a light scan is generated. In certain exemplary embodiments, a Lissajous scan is generated from the optical fiber, the optical fiber is a fixed-free, axially symmetric, cantilever beam optical fiber, and/or an optomechanical system with two distinct and substantially orthogonal resonant frequencies comprises the optical fiber. At activity 6400, the light is focused on a target via a lens. At activity 6500, light that is scattered and/or reflected from the target is collected and detected.

At activity 6600, a distance to the target is determined. Certain exemplary embodiments can determine a time-of-flight distance based upon a Lissajous scan, the Lissajous scan using a piezo tube actuator, piezo amplifier, and driver electronics, wherein the Lissajous scan has a frequency that is between approximately 500 Hz and approximately 3000 Hz. In certain exemplary embodiments, light collected upon which the time-of-flight distance is based is not collected via any optical fiber.

Definitions

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

a—at least one.
    activity—an action, act, step, and/or process or portion thereof
    analyze—to subject to mathematical and/or statistical analysis.
    and/or—either in conjunction with or in alternative to.
    apparatus—an appliance or device for a particular purpose.
    acquire—to obtain or collect.
    array—a systematic arrangement of similar devices and/or systems.
    associate—to join, connect together, and/or relate.
    autocorrelate—to automatically correlate.
    automatically—acting or operating in a manner essentially independent of external influence or control. For example, an automatic light switch can turn on upon "seeing" a person in its view, without the person manually operating the light switch.
    axial symmetry—symmetry around an axis; an object is axially symmetric if its appearance is unchanged if rotated around an axis.
    bound—to limit or restrain.
    can—is capable of, in at least some embodiments.
    cantilever beam—supported on a single end.
    cause—to produce an effect.
    circuit—an electrically conductive pathway and/or a communications connection established across two or more switching devices comprised by a network and between corresponding end systems connected to, but not comprised by the network.
    collect—to gather together.
    comprising—including but not limited to.
    configure—to make suitable or fit for a specific use or situation.
    constructed to—made to and/or designed to.
    continuous-wave—an electromagnetic wave of constant amplitude and frequency.
    control—to direct one or more activities.
    controller—a device and/or set of machine-readable instructions for performing one or more predetermined tasks.
    convert—to transform, adapt, and/or change.
    correlate—to establish a statistical relationship between two datasets.
    create—to bring into being.
    count—a numerical result of an adding discrete detected events.
    couple—to join, connect, and/or link two things together.
    data—distinct pieces of information, usually formatted in a special or predetermined way and/or organized to express concepts.
    data structure—an organization of a collection of data that allows the data to be manipulated effectively and/or a logical relationship among data elements that is designed to support specific data manipulation functions. A data structure can comprise metadata to describe the properties of the data structure. Examples of data structures can include: array, dictionary, graph, hash, heap, linked list, matrix, object, queue, ring, stack, tree, and/or vector.
    decode—to extract a meaning from a first signal and create a second signal based upon the meaning.
    define—to establish the outline, form, or structure of
    detect—to sense a physical measurement.
    detector—a device and/or system that senses a physical measurement.
    determine—to obtain, calculate, decide, deduce, and/or ascertain.
    device—a machine, manufacture, and/or collection thereof.
    distance—a quantity of space between two things.
    distant—more than five kilometers away.
    distinct—distinguished as not being the same; separate.
    distinguish—to identify a characteristic of something.
    electrical—of or pertaining to energy in a form of moving electrons via a conductor.
    element—a component of a system.
    equal—substantially the same as.
    estimate—to calculate and/or determine approximately and/or tentatively.
    feature—a conspicuous characteristic.
    fixed-free—having a first end that is fixedly coupled and a second end that is not fixedly coupled.
    focal plane array—a system comprising an array of distance measurement instruments.
    focus—to direct light rays on a location of convergence.
    formula—a mathematical equation.
    frequency—a rate of occurrence.
    generate—to create, produce, give rise to, and/or bring into existence.
    haptic—involving the human sense of kinesthetic movement and/or the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.

hard real time—of or relating to computer systems that provide an absolute deterministic response to an event. Such a response is not based on average event time. Instead, in such computer systems, the deadlines are fixed and the system must guarantee a response within a fixed and well-defined time within approximately five seconds of the event.

information device—any device capable of processing data and/or information, such as any general purpose and/or special purpose computer, such as a personal computer, workstation, server, minicomputer, mainframe, supercomputer, computer terminal, laptop, wearable computer, and/or Personal Digital Assistant (PDA), mobile terminal, Bluetooth device, communicator, "smart" phone (such as a Treo-like device), messaging service (e.g., Blackberry) receiver, pager, facsimile, cellular telephone, a traditional telephone, telephonic device, a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general any device on which resides a finite state machine capable of implementing at least a portion of a method, structure, and/or or graphical user interface described herein may be used as an information device. An information device can comprise components such as one or more network interfaces, one or more processors, one or more memories containing instructions, and/or one or more input/output (I/O) devices, one or more user interfaces coupled to an I/O device, etc.

initialize—to prepare something for use and/or some future event.

input—a signal received by a device and/or system.

input/output (I/O) device—any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.

instrument—a device and/or system constructed to measure a present value of a quantity under observation.

intensity—a magnitude of a signal property.

LIDAR—a surveying method that measures distance to a target by illuminating that target with a pulsed light, and measuring the reflected light pulses with a sensor. Being an acronym for Light Imaging, Detection, And Ranging.

light scan—an examination of something via a series of waves or pulses of light energy.

light source—a device and/or system from which luminous energy emanates.

Lissajous scan—a light scan that utilizes a pattern defined by parametric equations: $x = A \sin(at+\delta)$, $y + B \sin(bt)$.

local maxima—a largest value of the function, either within a given range (a local or relative extrema) or on the entire domain of a function (the global or absolute extrema).

machine instructions—directions adapted to cause a machine, such as an information device, to perform one or more particular activities, operations, or functions. The directions, which can sometimes form an entity called a "processor", "kernel", "operating system", "program", "application", "utility", "subroutine", "script", "macro", "file", "project", "module", "library", "class", and/or "object", etc., can be embodied as machine code, source code, object code, compiled code, assembled code, interpretable code, and/or executable code, etc., in hardware, firmware, and/or software.

machine readable medium—a physical structure from which a machine can obtain data and/or information. Examples include a memory, punch cards, etc.

map—to represent or transform.

match—to determine a correspondence with something.

material—something used in making items.

may—is allowed and/or permitted to, in at least some embodiments.

medium—a substance through which light pulses are transmitted.

memory device—an apparatus capable of storing analog or digital information, such as instructions and/or data. Examples include a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory device can be coupled to a processor and/or can store instructions adapted to be executed by processor, such as according to an embodiment disclosed herein.

method—a process, procedure, and/or collection of related activities for accomplishing something.

modulate—to vary one or more properties of a periodic waveform, called the carrier signal, with a modulating signal that can comprise information to be transmitted.

multiprocessor—a device and/or system constructed to execute two or more programs or instruction sequences substantially simultaneously, such as via separate processors under integrated control.

network—a communicatively coupled plurality of nodes. A network can be and/or utilize any of a wide variety of sub-networks, such as a circuit switched, public-switched, packet switched, data, telephone, telecommunications, video distribution, cable, terrestrial, broadcast, satellite, broadband, corporate, global, national, regional, wide area, backbone, packet-switched TCP/IP, Fast Ethernet, Token Ring, public Internet, private, ATM, multi-domain, and/or multi-zone sub-network, one or more Internet service providers, and/or one or more information devices, such as a switch, router, and/or gateway not directly connected to a local area network, etc.

network interface—any device, system, or subsystem capable of coupling an information device to a network. For example, a network interface can be a telephone, cellular phone, cellular modem, telephone data modem, fax modem, wireless transceiver, Ethernet card, cable modem, digital subscriber line interface, bridge, hub, router, or other similar device.

object—a tangible thing.

occur—to happen.

optical fiber—a filament of transparent dielectric material, usually glass or plastic, and usually circular in cross section, that guides light. An optical fiber usually has a cylindrical core surrounded by, and in intimate contact with, a cladding of similar geometry. So that the light can be guided by the fiber, the refractive index of the core is slightly different than that of the cladding.

optomechanical—comprising at least one element that interacts with light energy (e.g., lenses, mirrors, and/or prisms, etc.) and at least one mechanical structures (e.g., cells, housings, and/or trusses, etc.).

output—a signal in a form suitable for transmission.

peak—a highest magnitude of a signal and/or a value derived from a signal.

periodic motion—a movement pattern that repeats in regular intervals.

plurality—the state of being plural and/or more than one.

power supply—a source of electrical energy.

predetermined—established in advance.

probability—a quantitative representation of a likelihood of an occurrence.

processor—a device and/or set of machine-readable instructions for performing one or more predetermined tasks. A processor can comprise any one or a combination of hardware, firmware, and/or software. A processor can utilize mechanical, pneumatic, hydraulic, electrical, magnetic, optical, informational, chemical, and/or biological principles, signals, and/or inputs to perform the task(s). In certain embodiments, a processor can act upon information by manipulating, analyzing, modifying, converting, transmitting the information for use by an executable procedure and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium IV series of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein.

profile—a representation of a series of pulses.

project—to calculate, estimate, or predict.

provide—to furnish, supply, give, and/or make available.

pulse—a momentary, sudden fluctuation in an optical signal.

receive—to get as a signal, take, acquire, and/or obtain.

recommend—to suggest, praise, commend, and/or endorse.

reference—a signal having a known temporal pulse spacing that is used for comparison to another signal in which the temporal pulse spacing is not be known.

reflect—to cast back light from a surface.

remove—to take something away.

render—to make perceptible to a human, for example as data, commands, text, graphics, audio, video, animation, and/or hyperlinks, etc., such as via any visual, audio, and/or haptic means, such as via a display, monitor, electric paper, ocular implant, cochlear implant, speaker, etc.

repeatedly—again and again; repetitively.

request—to express a desire for and/or ask for.

resonant axes—straight lines about which a body or a geometric figure rotates or may be supposed to rotate and which rates of excitation are such that response amplitudes are at a relative maximum.

resonant frequency—a rate of excitation in a vibrating system at which a response amplitude of the vibrating system is at a relative maximum. At resonant frequencies, small periodic driving forces have the ability to produce large amplitude oscillations, due to the storage of vibrational energy.

responsive—reacting to an influence and/or impetus.

scan lens—a piece of transparent material that has two opposite regular surfaces either both curved or one curved and the other plane and that is used either singly or combined in an optical instrument for forming an image by focusing rays of light that is constructed for light scanning.

scatter—to cause to disperse.

select—to make a choice or selection from alternatives.

sense—to detect a physical measurement.

set—a related plurality.

signal—information, such as machine instructions for activities and/or one or more letters, words, characters, symbols, signal flags, visual displays, and/or special sounds, etc. having prearranged meaning, encoded as automatically detectable variations in a physical variable, such as a pneumatic, hydraulic, acoustic, fluidic, mechanical, electrical, magnetic, optical, chemical, and/or biological variable, such as power, energy, pressure, flowrate, viscosity, density, torque, impact, force, frequency, phase, voltage, current, resistance, magnetomotive force, magnetic field intensity, magnetic field flux, magnetic flux density, reluctance, permeability, index of refraction, optical wavelength, polarization, reflectance, transmittance, phase shift, concentration, and/or temperature, etc. Depending on the context, a signal and/or the information encoded therein can be synchronous, asynchronous, hard real-time, soft real-time, non-real time, continuously generated, continuously varying, analog, discretely generated, discretely varying, quantized, digital, broadcast, multicast, unicast, transmitted, conveyed, received, continuously measured, discretely measured, processed, encoded, encrypted, multiplexed, modulated, spread, de-spread, demodulated, detected, de-multiplexed, decrypted, and/or decoded, etc.

space—a temporal distance between pulses.

speed of light—299,792,458 meters per second.

store—to place, hold, and/or retain data, typically in a memory.

substantially—to a great extent or degree.

system—a collection of mechanisms, devices, machines, articles of manufacture, processes, data, and/or instructions, the collection designed to perform one or more specific functions.

target—an object at which something is aimed.

temporal—of or relating to time.

time difference—a temporal spacing between events.

time-of-flight distance—a measure of spacing between two things based upon a time that a measured wave needs to travel between the two things through a medium.

transmit—to send as a signal, provide, furnish, and/or supply.

user interface—any device for rendering information to a user and/or requesting information from the user. A user interface includes at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

value—a magnitude, quantity, and/or number.

via—by way of and/or utilizing.

weight—a value indicative of importance.

Note

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, description, abstract, drawing figure, etc.) of this application, unless clearly specified to the contrary, such as via explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

no characteristic, function, activity, or element is "essential";

any elements can be integrated, segregated, and/or duplicated;

any activity can be repeated, any activity can be performed by multiple entities, and/or any activity can be performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any claim element is followed by a drawing element number, that drawing element number is exemplary and non-limiting on claim scope. No claim of this application is intended to invoke paragraph six of 35 USC 112 unless the precise phrase "means for" is followed by a gerund.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such material is specifically not incorporated by reference herein.

Accordingly, every portion (e.g., title, field, background, summary, description, abstract, drawing figure, etc.) of this application, other than the claims themselves, is to be regarded as illustrative in nature, and not as restrictive, and the scope of subject matter protected by any patent that issues based on this application is defined only by the claims of that patent.

What is claimed is:

1. A resonant scanning LIDAR system comprising:
    a modulated continuous-wave or pulsed light source;
    an optomechanical element that generates a light scan having a bounded periodic motion or a substantially periodic motion, wherein;
        frequency of motion from the optomechanical element occurs at a resonant frequency of the system;
        the light scan is a Lissajous scan; and
        the light scan has a frequency that is between 500-3000 Hz;
    a scan lens element that focuses light onto a distant target;
    a detector element that detects scattered or reflected light from the distant target, wherein the detector element utilizes separate optics from the optomechanical element; and
    a controller that controls light source modulation, bounded periodic motion of the optomechanical element, and acquires a signal from the detector element.

2. The system of claim 1, wherein:
resonant frequencies of the system are approximately 2033 Hz and approximately 1728 Hz.

3. The system of claim 1, wherein:
the system is capable of distinguishing features less than approximately 0.6 degrees.

4. The system of claim 1, wherein:
the detector element does not detect light via an optical fiber.

5. A method comprising a plurality of activities, comprising:
determining a time-of-flight distance based upon a Lissajous scan, the Lissajous scan using a piezo tube actuator, piezo amplifier, and driver electronics, wherein the Lissajous scan has a frequency that is between 500-3000 Hz.

6. The method of claim 5, further comprising:
removing material along a length of an optical fiber, wherein an axial symmetry of a cross section of the optical fiber is broken and two resonant axes are created wherein:
the Lissajous scan is generated from the optical fiber; and
the optical fiber is a fixed-free, axially symmetric, cantilever beam optical fiber.

7. The method of claim 5, wherein:
the Lissajous scan is generated from an optical fiber; and
an optomechanical system with two distinct and substantially orthogonal resonant frequencies comprises the optical fiber.

8. The method of claim 5, wherein:
light collected upon which the time-of-flight distance is based is not collected via any optical fiber.

* * * * *